United States Patent [19]
Kim et al.

[11] Patent Number: 5,858,026
[45] Date of Patent: Jan. 12, 1999

[54] DICYCLIC METAL COMPLEX FORMAZAN DERIVATIVES, PROCESS FOR PRODUCING THE SAME, COMPOSITION CONTAINING THE SAME AND DYEING PROCESS EMPLOYING THE SAME

[75] Inventors: Dong Gil Kim; Sung Yong Cho, both of Seoul, Rep. of Korea

[73] Assignee: Kyung-In Synthetic Corporation, Rep. of Korea

[21] Appl. No.: 750,405

[22] PCT Filed: Apr. 8, 1996

[86] PCT No.: PCT/KR96/00049

§ 371 Date: Dec. 5, 1996

§ 102(e) Date: Dec. 5, 1996

[87] PCT Pub. No.: WO96/33240

PCT Pub. Date: Oct. 24, 1996

[30] Foreign Application Priority Data

Apr. 8, 1994 [KR] Rep. of Korea .......................... 95-8192

[51] Int. Cl.⁶ .............................. C09B 62/018; D06P 1/38
[52] U.S. Cl. ................................................. 8/566; 534/618
[58] Field of Search .................................. 8/566; 534/618

[56] References Cited

U.S. PATENT DOCUMENTS

| | | | |
|---|---|---|---|
| 4,556,706 | 12/1985 | Hegar et al. | 534/618 |
| 4,607,098 | 8/1986 | Schwaiger | 534/618 |
| 4,935,500 | 6/1990 | Omura et al. | 534/618 |

FOREIGN PATENT DOCUMENTS

| | | |
|---|---|---|
| 0 099 721 | 2/1984 | European Pat. Off. . |
| 55-12187 | 1/1980 | Japan . |
| 56-4783 | 1/1981 | Japan . |
| 1 194 504 | 6/1970 | United Kingdom . |
| 1 219 383 | 1/1971 | United Kingdom . |

*Primary Examiner*—Mukund J. Shah
*Assistant Examiner*—Deepak R. Rao
*Attorney, Agent, or Firm*—David J. Brezner; Robin M. Silva; Flehr Hohbach Test Albritton & Herbert LLP

[57] ABSTRACT

The invention relates to dicyclic metal complex formazan dye derivatives and processes for producing compositions and for using them in dyeing processes.

13 Claims, No Drawings

DICYCLIC METAL COMPLEX FORMAZAN DERIVATIVES, PROCESS FOR PRODUCING THE SAME, COMPOSITION CONTAINING THE SAME AND DYEING PROCESS EMPLOYING THE SAME

This application is a 371 of PCT/KR96/00049 filed Apr. 8, 1996.

TECHNICAL FIELD

The present invention relates to formazan derivatives useful as reactive dye and a process for producing the derivatives. More specifically, the present invention relates to a novel dicyclic metal complex formazan derivatives used as a light blue dye and a process for producing the derivatives.

BACKGROUND ART

Generally, metal complex formazan derivatives are used as complex salt of divalent or trivalent metal such as copper, nickel, cobalt and chromium, have brighter colors than conventional azo dyes, and have an excellent compatibility with the other color dyes as compared with anthraquinone or dioxazine-based dyes.

Formazan derivatives as reactive dyes which have a form of copper complex or have a vinylsulfone group or both of vinylsulfone group and monochlorotriazine, have been developed long time ago. The conventional formazan are mostly tricyclic. Most of them are 2-carboxyl-5-sulfophenylhydrazine as hydrazine compound. These tricyclic formazans are expensive in manufactruing and poor in stability for alkali at the time of room tepperature immersion (cold pad) dyeing.

Typical tricyclic formazan compounds have the following formula:

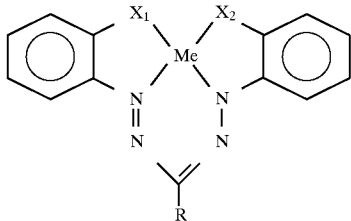

Specifically, Japanese Patent Publication No. 81-4783 describes a compound represented by the below formula:

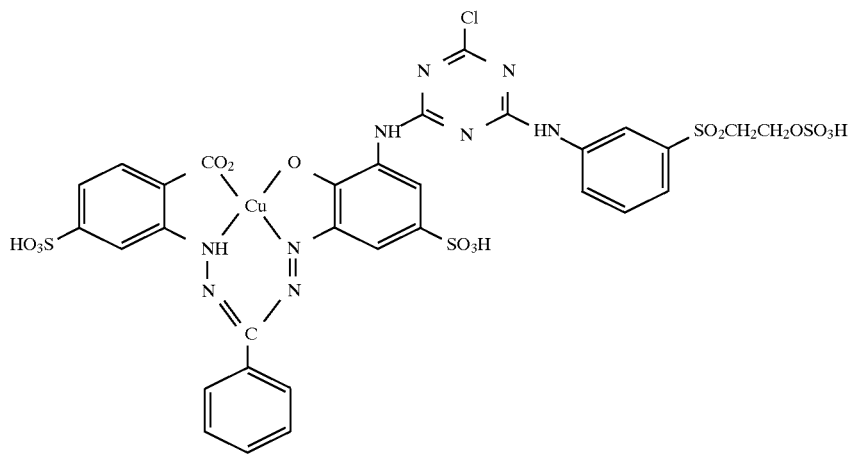

However, the said compound of Japanese Patent Publication No.81-4783 is not good in solubility, dyeing property and state of remained bath. In addition, Japanese Patent Publication Sho 55-12187 and EP 0,099,721 disclose tricyclic formazan derivatives as dye similiar to the compound of the Japanese Patent Publication No.81-4783. But, these dyes are expensive in manufacturing cost and are not good in fastness.

Further, United Kingdom Patent Publication 1,194,504 discloses dicyclic formazan derivatives having the following formula:

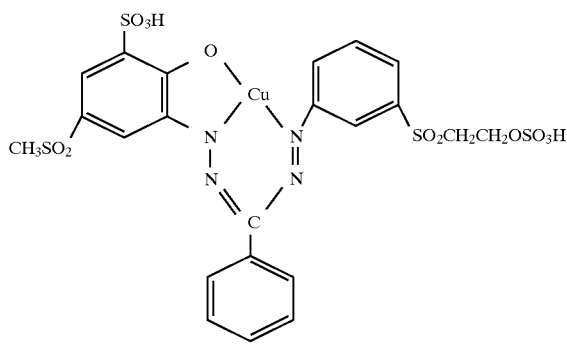

The said dicyclic formazan derivatives is also not good in fastness and dyeing property.

U.S. Pat. No. 4,607,098 discloses a compound of the following formula which has more improved fastness than the said dicyclic formazan derivatives:

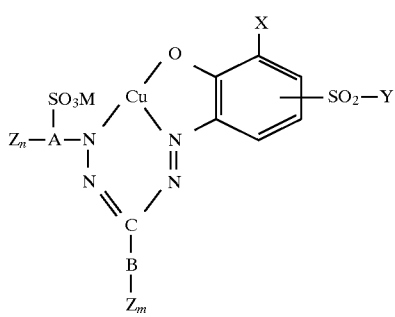

However, these formazan compounds known in U.S. Pat. No. 4,607,098 have also somewhat problems in dyeing property and chlorine water.

DISCLOSURE OF THE INVENTION

The inventors have made extensive and intensive studies with a view to solving the above-described problems, and thereby have obtained novel formazan derivatives represented by the below formula (1):

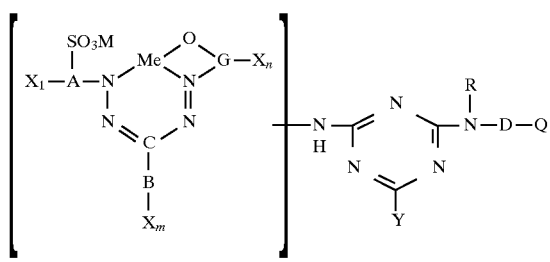

wherein

A is benzene or naphthalene having 1 to 3 substituent groups and sulfo group ($-SO_3M$) in ortho-position for N-atom of hydrazone compound;

B is straight- or branched-chained alkyl group, phenyl group or naphthyl group having 0–5 substituent groups, or heterocyclic group;

G is benzene or naphthalene having from 1 to 3 substituent groups;

D is benzene or naphthalene;

M is hydrogen atom, alkali metal or alkali earth metal;

Me is metal ion of atomic number 27 to 29;

Y is halogen;

X is hydrogen atom or sulfo ($-SO3M$) group, carboxyl group, phosphonic group providing solubility for water;

R is strait- or branched-chain alkyl group;

Q is $-SO_2CH=CH_2$, or $-SO_2CH_2CH_2L$ (L is $-OP_3H_2$, $-SSO_3H_2$ or $-OSO_3H$; and l,m,n are independently an intenger from 0 to 3.

Formazan derivatives represented by the above formula (1) are produced by firstly condensing formazan compound of the below formula (2) with 1,3,5-trihalogeno-s-triazine to give formazan compound of the below formula (3), and secondly condensing the obtained formazan compound of the formula (3) with amine compound of the below formula (4):

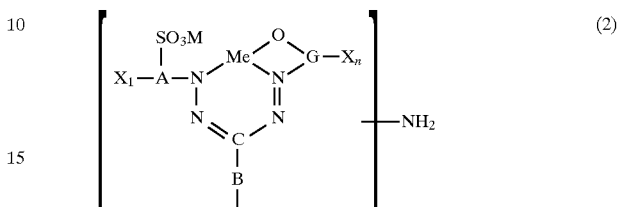

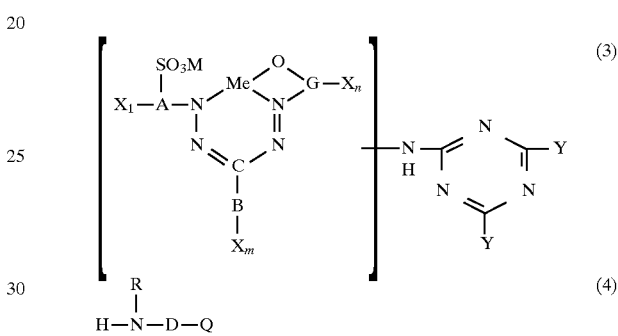

Alternatively, formazan derivatives of the formula (1) are produced by reacting 1,3,5-trihalogeno-s-triazine with the amine compound of the formula (4) to give a compound of the below formula (5), and then reacting the obtained compound of the formula (5) with formazan derivatives of the formula (2):

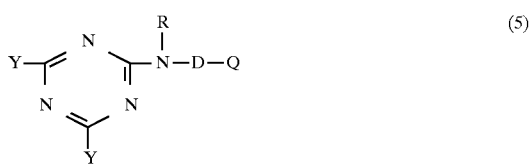

The definitions in the compounds of the above formula (2) and (3) are same as in the compound of the formula (1). However, the substituents of benzene or naphthalene ring in definitions A and G are preparably halogen, nitro, $C_1$–$C_4$ alkyl group, $C_1$–$C_4$ alkoxy group, sulfamoyl group, N-mono or N,N-dialkyl($C_1$–$C_4$)sulfamoyl, $C_1$–$C_4$ alkylsulfonyl group, phenylsulfonyl group, more preferably chlorine, bromine, nitro, methyl, ethyl, methoxy, ethoxy, sulfamoyl or N,N-dimethylsulfamoyl group.

If B is a straight or branched chain, it is preferably $C_1$–$C_8$, more preferably $C_2$–$C_8$.

If B is a benzene or naphthalene, the substituent is preferably halogen, hydroxy group, nitro group, $C_1$–$C_4$ alkyl, $C_1$–$C_4$ alkoxy group, $C_1$–$C_4$ carboalkoxy group.

If B is heterocyclic ring, the substituent is preferably furan, thiophen, pyrrol, imidazole, indol, pyrazole, pyridine, pyrimidine, quinoline, benzimidazole and the like. Hydrogen atom bonded to the ring-membered carbon consisting of heterocyclic ring may be substituted with chloro, phenyl, methyl, ethyl, methoxy or ethoxy, and hydrogen atom bonded to hetero atom of the heterocyclic ring may be substituted with methyl, ethyl or benzyl.

Me as metalic atom is preferably a compound of atomic number 27 to 29, more preferably atomic number 29, Cu.

In the compounds of the above formula (1), (3) and (5), halogen of definition Y is preferably fluorine, chlorine or bromine atom, more preferably fluorine or chlorine atom.

X group providing solubility for water, is preferably sulfonic acid, carboxylic acid or phosphonic acid, more preferably sulfonic acid, which may be bonded to ring-membered carbon atom consisting of ring or to aliphatic carbon atom linked to ring.

In the compounds of the above formula (1), (4) and (5), if D is phenyl, it may be substituted with halogen, $C_1$–$C_4$ alkyl group or $C_1$–$C_4$ alkoxy group, preferably methyl, ethyl, methoxy, ethoxy, chlorine or bromine. And if D is naphthalene, it is preferably unsubstituted or substituted with sulfonic group.

Further, in the compounds of the formula (1), (4) and (5), if R is alkyl group, it is preferably low alkyl groups such as methyl, ethyl, propyl and butyl, more preferably methyl, ethyl, carbamoyl, ethyl, hydroxyethyl, n-propyl, isopropyl and the like, which may be substituted with hydroxyl, carboxyl, sulfo, carbamoyl, methoxy carbonyl group and the like.

l,m and n independently, are preferably 2 or 3.

In the compounds of the above formula (1), (4) and (5), if Q is —$SO_2CH_2CH_2L$, L is preferably ester group, —$OPO_3H_2$, —$SSO_3H_2$, more preferably —$OSO_3H$ of organic carboxylic acid or sulfonic acid comprising chlorine, bromine atom or acetyloxy group, benzoyloxy group, benzene sulfonyloxy group and low alkane oxy group.

Accordingly, Q can be represented by —$SO_2CH_2CH_2OSO_3H$, wherein a part of these elements may be removed by alkali to give a form of —$SO_2CH=CH_2$.

A group of the below formula (5') in the formula (1) may be linked to any one of phenyl, naphthyl, alkyl, alkenyl, phenylene, naphthalene, heterocycle or carbon atom of branched-chain, preferably phenyl group:

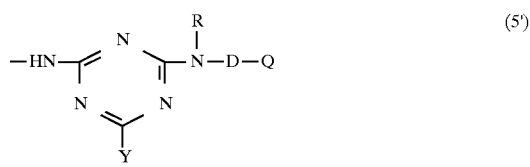

(5')

Formazan derivatives of the formula (1) according to the above preferable definitions are represented by the below formula (6):

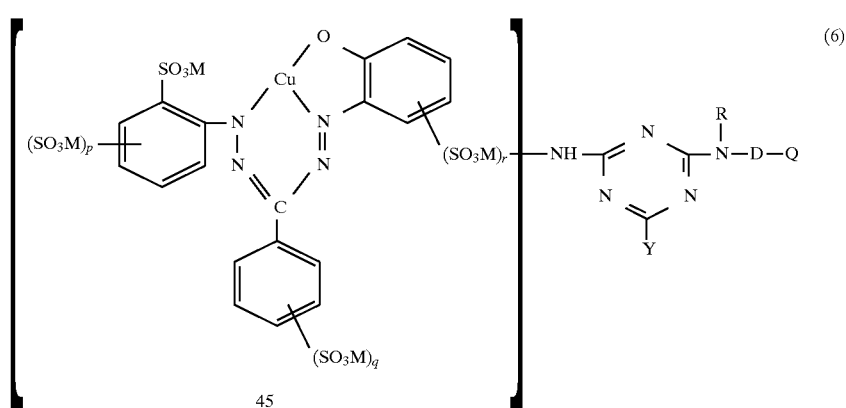

(6)

wherein D,R,Q and Y are same as defined in the formula (1), (3),(4) and (5), p,q and r are independently 0 or 1, provided that the total amount of them is an intenger of 3 or less.

More preferable formazan derivatives is represented by the below formula (6'):

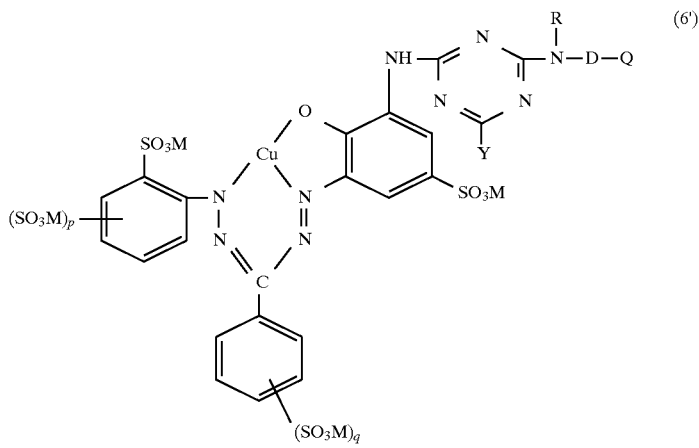

Most preferable formazan derivatives is represented by the below formula (6"):

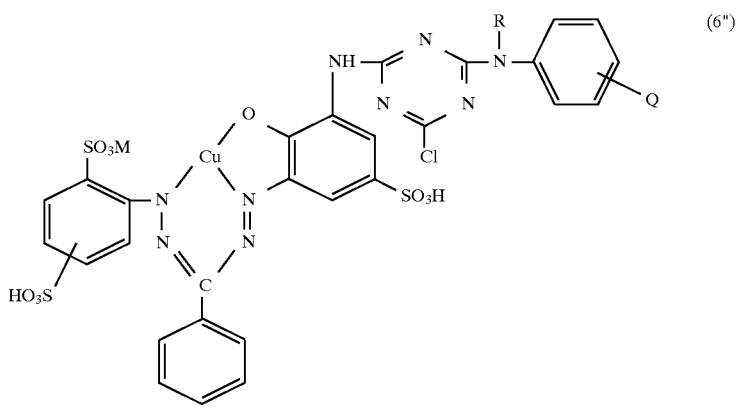

Formazan derivatives of the formula (1) according to the present invention are produced by reacting a formazan compound of the above formula (2) with 1,3,5-trihalogeno-s-triazine to give a formazan compound of the below formula (3), and condensing the obtained formazan compound of the formula (3) with an amine compound of the above formula (4); or by reacting 1,3,5-trihalogeno-s-triazine with the amine compound of the formula (4) to give a compound of the below formula (5), and then reacting the obtained compound of the formula (5) with formazan derivatives of the formula (2).

Reaction conditions and order in this process are not specifically limited, the condensation reaction are conducted generally at pH 2 to 8 and temperature of −5° to 70° C., preferably pH 3 to 6 and temperature of 0° to 60° C.

More specifically, the reaction condition in the first condensation may depend on physical properties of the reactants or intermediates to be produced, but is relatively low pH and reaction temperature. That is to say, the first condensation reaction is conducted at pH 2 to 4 and temperature of −5° to 20° C., preferably pH 3 to 4 and temperature of 0° to 10° C.

But, the second dondensation reaction depends on physical prorerties of reactants and formazan derivatives to be produced, and is conducted at relatively high pH, for example pH 4 to 8 and relatively high temperature of 20° to 70° C., preferably pH 4 to 6 and relatively high temperature of 30° to 60° C.

Formazan derivatives of the formula (2) can be produced by diazotating an amine compound of the below formula (7) to give a sulfone compound, hydrolizing the obtained sulfone compound in the presence of inorganic acid to give hydrazine compound, reacting the obtained compound with aldehyde compound of the formula (8) to synthesize hydrazone compound, reacting the obtained hydrazone compound with the compound of the below formula (9) to diazotate it, and then coupling them in the presence of metal ion:

If the above obtained compound is not amine compound of the formula (2) but compound of the below formula (10) having nitro or acetylamino group, the compound of the formula (2) can be easily produced by reduction of nitro group or hydrolysis of acetylamino group:

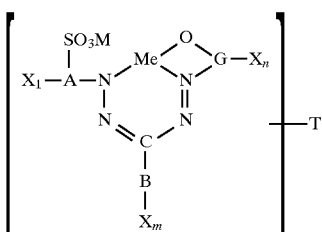

(10)

wherein T is nitro group or acetylamino group, and definition for the other symbols are same as these of the above formula (1).

Metal ion used in this process are sulfate, carbonate, acetate, salisilate, tartarate or chloride which concerns in the reaction.

Examples of the compound represented by the formula (7) are aniline-2-sulfonic acid, aniline-2,4-disulfonic acid, aniline-2,5-disulfonic acid, 4-methylaniline-2-sulfonic acid, 5-methylaniline- 2-sulfonic acid, 2,4-dimethylaniline-2-sulfonic acid, 4,5-dimethylaniline-2-sulfonic acid, 2-methylaniline-4,6-disulfonic acid, 4-methylaniline-2,5-disulfonic acid, 4-methoxyaniline-2-sulfonic acid, 5-methoxyaniline-2-sulfonic acid, 4-methoxy-5-chloroaniline-2-sulfonic acid, 4,5-dimethoxyaniline-2-sulfonic acid, 4-ethoxyaniline-2-sulfonic acid, 5-ethoxyaniline-2-sulfonic acid, 4-hydroxyaniline-2-sulfonic acid, 5-hydroxyaniline-2-sulfonic acid, 5-hydroxyaniline-2,4-disulfonic acid, 4-carboxylaniline-2-sulfonic acid, 5-carboxylaniline-2-sulfonic acid, 4-hydroxy-3-carboxylaniline-2-sulfonic acid, 4-nitroaniline-2-sulfonic acid, 5-nitroaniline-2-sulfonic acid, 2,4-dinitroaniline-6-sulfonic acid, 5-nitro-4-chloroaniline-2-sulfonic acid, 4-fluoroaniline-2-sulfonic acid, 3-chloroaniline-2-sulfonic acid, 4-chloroaniline-2-sulfonic acid, 5-chloroaniline-2-sulfonic acid, 4,5-dichloroaniline-2-sulfonic acid, 2,4-dichloroaniline-6-sulfonic acid, 2,4,5-trichloroaniline-2-sulfonic acid, 4-chloro-5-carboxylaniline-2-sulfonic acid, 2,5-dichloro-4-nitroaniline-6-sulfonic acid, 4-bromoaniline-2-sulfonic acid, 5-bromoaniline-2-sulfonic acid, 2,4-dibromoaniline-6-sulfonic acid, 3,4-dibromoaniline-6-sulfonic acid, 4-iodoaniline-2-sulfonic acid, 5-iodoaniline-2-sulfonic acid, 4-acetaminoaniline-2-sulfonic acid, 5-acetaminoaniline-2-sulfonic acid, 1,4-pbenylenediamine-2,5-disulfonic acid, 1,3-phenylenediamine-4,6-disulfonic acid, 1-naphthylamine-2-sulfonic acid, 2-naphthylamine-1-sulfonic acid, 1-naphthylamine-2,4-disulfonic acid, 1-naphthylamine-2,5-disulfonic acid, 2-naphthylamine-1,5-disulfonic acid, 2-naphthylamine-1,7-disulfonic acid, 2-naphthylamine-3,6-disulfonic acid, 2-naphthylamine-3,7-disulfonic acid, 1-naphthylamine-2,4,7-trisulfonic acid, 2-naphthylamine-3,6,8-trisulfonic acid, 2-naphthylamine-1,5,7-trisulfonic acid.

Examples of the aldehyde compound represented by the forumla (8) are benzaldehyde, 2-methoxybenzaldehyde, 3-methoxy benzaldehyde, 4-methoxybenzaldehyde, 4-methoxybenzaldehyde-3-sulfonic acid, 2-methylbenzaldehyde, 3-methylbenzaldehyde, 4-methoxy-3-chlorobenzaldehyde, 2-nitrobenzaldehyde, 3-nitrobenz aldehyde, 2-hydroxybenzaldehyde, 2-chlorobenzaldehyde, 4-chlorobenzaldehyde, 2,4-dichlorobenzaldehyde, 2-chlorobenzaldehyde-5-sulfonic acid, benzaldehyde-2-sulfonic acid, benzaldehyde-3-sulfonic acid, benzaldehyde-4-sulfonic acid, benzaldehyde-2,4-disulfonic acid, 2-acetylaminobenzaldehyde, 4-acetylaminobenz aldehyde, 4-nitrobenzaldehyde-2-sulfonic acid, 3-methyl-2-nitrobenzaldehyde, 3-methyl-6-nitrobenzaldehyde, 2-chloro-6-nitrobenzaldehyde, 1-naphthoaldehyde, 2-naphthoaldehyde, furan-2-aldehyde, thiophene-2-aldehyde, pyrrol-2-aldehydeimidazole-2-aldehyde, pyrazole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, acetaldehyde, buthylaldehyde, ethanealdehyde, acrylaldehyde, crotonaldehyde, phenacetaldehyde, cinamaldehyde.

Examples of the amine compound represented by the formula (9) are 2-aminophenol, 4-methyl-2-aminophenol, 5-methyl-2-aminophenol, 4-sulfo-2-aminophenol, 5-sulfo-2-aminophenol, 4-methoxy-2-aminophenol, 5-methylsulfonyl-2-aminophenol, 4-methyl sulfamoyl-2-aminophenol, 4-dimethylsulfamoyl-2-aminophenol, 5-nitro-2-aminophenol, 4-bromo-2-aminophenol, 4,6-disulfo-2-aminophenol, 2-acetylamino-6-aminophenol-4-sulfonic acid, 6-nitro-4-sulfo-2-aminophenol, 4-nitro-6-sulfo-2-aminophenol, 4-acetylamino-6-sulfo-2-aminophenol, 4-chloro-6-sulfo-2-aminophenol, 6-chloro-4-sulfo-2-aminophenol, 4-methylsulfonyl-2-aminophenol, 4-buthylsulfonyl-2-aminophenol, 4-ethylsulfonyl-2-aminophenol, 4-sulfamoyl-2-aminophenol, 1 -amino-2-hydroxynaphthalene-4,6-disulfonic acid, 1-amino-2-hydroxynaphthalene-6-chloronaphthalene-4-sulfonic acid, 4-methylol-6-sulfo-2-aminophenol.

Aromatic amine represented by the above formula (4) can be produced by alkylating aromatic amine of the below formula (11) in the presence of alkylating agent such as alkylhalide, dialkylsulfate, monosubstituted ethylene oxide:

$H_2N-D-Q$ (11)

Examples of alkylhalide are halides such as methylchloride, ethylchloride, n-propylchloride, isopropylchloride, n-buthylchloride, isobuthylchloride, sec-buthylchloride, methylbromide, ethylbromide, n-propylbromide, isopropylbromide, n-buthylbromide, isobuthyl bromide, and sec-buthylbromide; and examples of mono substituted ethylene are acrylonitrile, acrylic acid, methylacrylate, ethylacrylate, acrylamide, and binylsulfonic acid.

Examples of dialkylsulfate are dimethylsulfate, diethylsulfate and dipropylsulfate; and examples of oxide are ethyleneoxide, propyleneoxide, glycol, trimethyleneoxide, β-buthyloxide, 2-methyl-α-buthyleneoxide, 2-ethyl-3-methyleneoxide, methoxyethyleneoxide, methoxyleneoxide and n-buthoxyyleneoxide.

Aromatic amine compound of the above formula (11) can be produced by esterizing or halogenizing a compound of the below formula (12):

$H_2N-D-SO_2CH_2CH_2OH$ (12)

Examples of aromatic amine compound represented by the above formula (11) which cna be produced by the said process, are 1-aminobenzene-2,3-β-sulfatoethylsulfone, 1-aminobenzene-2,4-β-sulfatoethylsulfone, 1-aminobenzene-3-phosphatoethylbenzene, 1 -amino-4-methylbenzene-3-β-sulfatoethylsulfone, 1-aminobenzene-3-β-phosphatoethylbenzens, 1-aminobenzene-4-methoxybenzens-3-β-sulfatoethylsulfone, 1-amino-2,5-dimethylbenzene-4-β-sulfatoethylsulfone, 1-amino-4-methoxybenzene-4-β-sulfatoethylsulfone, 1-amino-4-chlorobenzene-4-β-sulfatoethylsulfone, 1-amino-4-methoxybenzene-5-β-sulfatoethylsulfone, 2-aminonaphthalene-8-β-sulfatoethylsulfone-6-sulfonic acid, 2-aminonaphthalene-8-β-sulfatoethylsulfone, 1-amino-2,5-dimethoxybenzene-4-vinylsulfone, 1-amino-2-methoxy-5-methylbenzene-4-β-sulfatoethylsulfone, 2-aminonaphthalene-4,5,6-β-sulfatoethylsulfone, 2-aminonaphthalene-4,5,7-β-sulfatoethylsulfone, 1-amino-2-bromobenzene-4-vinylsulfone, 2-amino-8-sulfonaphthalene-6-β-sulfatoethylsulfone, 2-aminonaphthalene-8-β-phosphatoethylsulfone-6-sulfonic acid, 2-aminonaphthalene-8-vinylsulfone-6-sulfonic acid, 1-amino-2-methoxy-5-methylbenzene-4-β-chloroethylsulfone, 1-aminobenzene-2,3-vinylsulfone, 1-aminobenzene-2,4-vinylsulfone, 1-amino-2-methoxy-5-chlorobenzene-4-β-chloroethylsulfone, 1-amino-2-methoxy-5-chlorobenzene-4-vinylsulfone, 1-amino-2-ethoxy-5-chlorobenzene-4-β-chloroethylsulfone, 1-amino-2-ethoxy-5-chlorobenzene-4-vinylsulfone, 2-aminonaphthalene-8-β-sulfatoethylsulfone-1-sulfonic acid, 5-chloroaniline-2-β-sulfatoethylsulfone, 5-sulfoaniline-2-β-sulfatoethylsulfone, aniline-2-β-thiosulfatoethylsulfone, 5-chloroaniline-2-β-thiosulfato ethylsulfone, 5-sulfoaniline-2-β-thiosulfatoethylsulfone, aniline-2-β-phosphatoethylsulfone, 5-chloroaniline-2-β-phosphatoethylsulfone, 5-sulfoaniline-2-β-phosphatoethylsulfone, 5-chloroaniline-2-vinylsulfone, 5-sulfoaniline-2-vinylsulfone, aniline-2-β-chloro ethylsulfone, 5-chloroaniline-2-β-chloroethylsulfone and 5-sulfoaniline-2-β-chloroethylsulfone.

BEST MMODE FOR CONDUCTING THE INVENTION

Process for preparing formazan derivatives according to the present invention is more specifically described in the following examples, however the present invention is not intended to be restricted to the examples.

EXAMPLE 1

Phenylhydrazine-2,5-disulfonic acid is produced by diazotating aniline-2,5-disulfonic acid of the formula (7). 35.6 parts of benzaldehyde phenylhydrazone-2,5-sulfonic acid is produced by reacting the above obtained phenylhydrazine-2,5-disulfonic acid with benzaldehyde of the formula (8). 35.6 parts of phenylhydrazone-2,5-sulfonic acid is dispersed in 200 parts of water, and acidity of the dispersion is controled to pH 4 with a solution of 10% sodium hydroxide. 24.6 parts of 3-acetylamino-2-hydroxyaniline-5-sulfonic acid of the formula (9) is diazotated and added to the said pH-controled solution with stirring. Aqueous solution obtained by solubilize 26.2 parts of copper sulfate to water is added thereto. pH of the solution is controlled in the range from 3 to 5 with 20% sodium carbonate aquous solution obtained by solubilizing sodium carbonate and reaction is conducted for one hour. The reaction is conducted at elevated temperature of 40° to 50° C. for one hour to complete the reaction. The reaction solution is cooled to the room temperature, and 20% of sodium chloride based on the entire solution is added to this solution, and stirred for one hour. The precipitate is filtered out to give formazan derivatives. The formazan derivatives is added to a solution of sodium hydroxide, hydrolized by heating at temperature of 90° C. for one hour to obtain the product. As a result, dicyclic formazan derivatives represented by the below formula is obtained by removing acetyl group from the product:

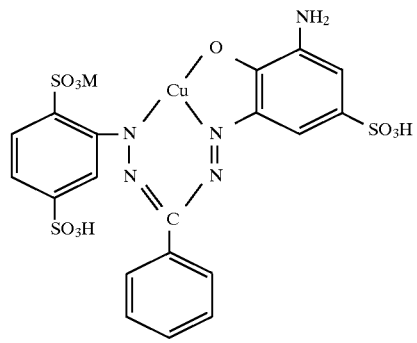

EXAMPLE 2

Formazan derivatives obtained in Example 1 is acidified to pH 3 to 4 with concentrated hydrochloric acid, and 16.6 parts of cyanuric chloride are added thereto with maintaining them at temperature of 5° C. for one hour to give formazan derivatives represented by the below formula (3):

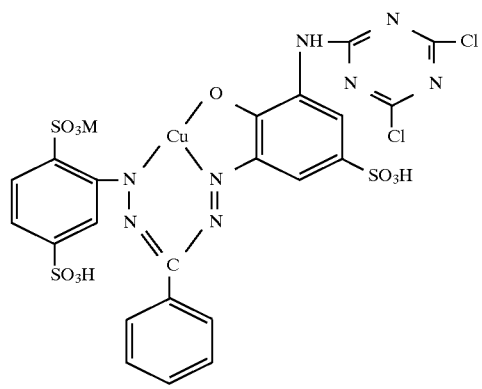

EXAMPLE 3

To a solution containing formazan derivatives obtained in Example 2 are added 27.8 parts of 1-N-ethylaminobenzene-3-β-sulfatoethylsulfone produced by reacting 1-aminobenzene-3-β-sulfatoethylsulfone with diethylsulfate. The mixture is heated to temperature of 40° C., and is maintained at pH 5 to 6 for 25 hours.

To the reaction-completed solution is added sodium chloride to give preciitate which is filtered out to obtain blue (603 nm) formazan derivatives of the below formula:

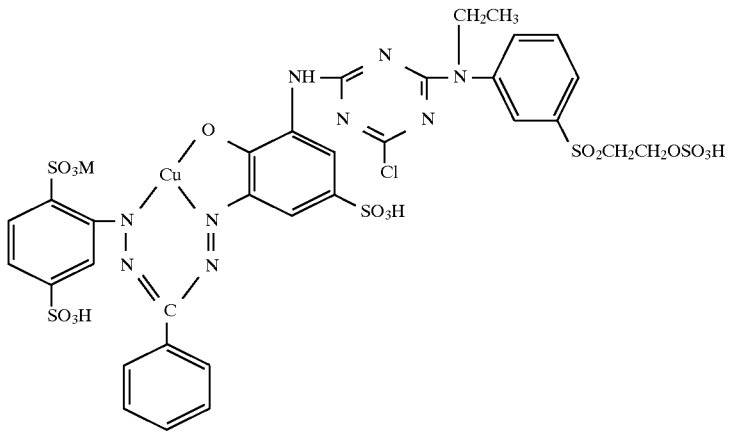

EXAMPLES 4 to 44

The procedures described in Example 3 are repeated in a solution containing formazan derivatives obtained in Examples 1 and 2 by using the following compounds instead of compounds used in Examples 1 and 2. As a result, blue (603±2 nm) formazan derivatives are obtained.

| Example No. | Used compounds |
|---|---|
| 4 | 1-N-ethylaminobenzene-4-β-sulfatoethylsulfone |
| 5 | 1-N-ethylaminobenzene-2-β-sulfatoethylsulfone |
| 6 | 1-N-methylamino-4-methoxybenzene-3-β-sulfatoethylsulfone |
| 7 | 1-N-methylaminobenzene-3-β-sulfatoethylsulfone |
| 8 | 1-N-methylaminobenzene-4-β-sulfatoethylsulfone |
| 9 | 1-N-methylaminobenzene-2-β-sulfatoethylsulfone |
| 10 | 1-N-methylamino-4-methoxybenzene-3-β-sulfatoethylsulfone |
| 11 | 1-N-β-carbamoylethylaminobenzene-3-β-sulfatoethylsulfone |
| 12 | 1-N-β-carbamoylethylaminobenzene-4-β-sulfatoethylsulfone |
| 13 | 1-N-β-carbamoylethylaminobenzene-2-β-sulfatoethylsulfone |
| 14 | 1-N-β-carbamoylmethylamino-4-methoxybenzene-3-β-sulfatoethylsulfone |
| 15 | 1-N-n-propylaminobenzene-3-β-sulfatoethylsulfone |
| 16 | 1-N-n-propylaminobenzene-4-β-sulfatoethylsulfone |
| 17 | 1-N-n-propylaminobenzene-2-β-sulfatoethylsulfone |
| 18 | 1-N-n-propylamino-4-methoxybenzene-3-β-sulfatoethylsulfone |
| 19 | 1-N-β-cyanoethylaminobenzene-3-β-sulfatoethylsulfone |
| 20 | 1-N-β-cyanoethylaminobenzene-4-β-sulfatoethylsulfone |
| 21 | 1-N-β-cyanoethylaminobenzene-2-β-sulfatoethylsulfone |
| 22 | 1-N-β-cyanoethylamino-4-methoxybenzene-3-β-sulfatoethylsulfone |
| 23 | 1-N-β-hydroxyethylaminobenzene-3-β-sulfatoethylsulfone |
| 24 | 1-N-β-hydroxyethylaminobenzene-4-β-sulfatoethylsulfone |
| 25 | 1-N-β-hydroxyethylaminobenzene-2-β-sulfatoethylsulfone |
| 26 | 1-N-β-hydroxyethylaminobenzene-4-methoxybenzene-3-β-sulfatoethylsulfone |
| 27 | 1-N-β-sulfatoethylaminobenzene-3-β-sulfatoethylsulfone |
| 28 | 1-N-β-methoxycarbonylethylaminobenzene-3-β-sulfatoethylsulfone |
| 29 | 1-N-ethylamino-2-methoxybenzene-5-β-sulfatoethylsulfone |
| 30 | 1-N-ethylamino-2,4-dimethylbenzene-5-β-sulfatoethylsulfone |
| 31 | 1-N-ethylamino-2-methoxy-5-methylbenzene-3-β-sulfatoethylsulfone |
| 32 | 1-N-ethylaminonaphthalene-6-β-sulfatoethylsulfone |
| 33 | 1-N-ethylamino-8-sulfonaphthalene-6-β-sulfatoethylsulfone |
| 34 | 1-N-methylaminonaphthalene-8-β-sulfatoethylsulfone |
| 35 | 1-aminobenzene-4-β-sulfatoethylsulfone |
| 36 | 1-aminobenzene-2-β-sulfatoethylsulfone |
| 37 | 1-aminobenzene-3-β-sulfatoethylsulfone |
| 38 | 1-amino-4-methoxybenzene-3-β-sulfatoethylsulfone |
| 39 | 1-amino-2-methoxybenzene-5-β-sulfatoethylsulfone |
| 40 | 1-amino-2-methoxy-5-methylbenzene-5-β-sulfatoethylsulfone |
| 41 | 1-amino-2,4-dimethylbenzene-5-β-sulfatoethylsulfone |
| 42 | 1-aminonaphthalene-6-β-sulfatoethylsulfone |
| 43 | 1-amino-8-sulfonaphthalene-6-β-sulfatoethylsulfone |
| 44 | 1-aminonaphthalene-8-β-sulfatoethylsulfone |

EXAMPLES 45

The reaction is conducted at the same condition and procedure as those of Example 1, except that phenylhydrazine-2.4-disulfonic acid as a starting material is used instead of phenylhydrazine-2.5-disulfonic acid to give formazan derivatives represented by the below formula.

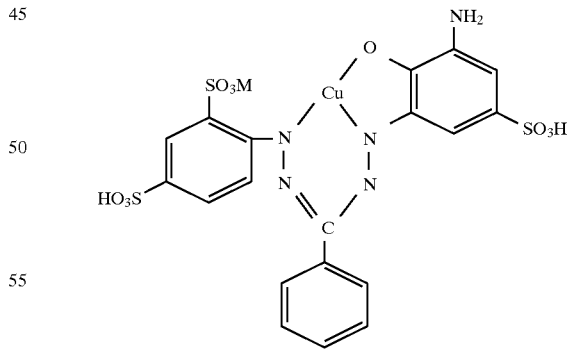

EXAMPLES 46

The reaction between formazan derivatives produced from Example 45 and cyanurilchloride of Example 2 is conducted at the same reaction condition to give formazan derivatives represented by the below formula:

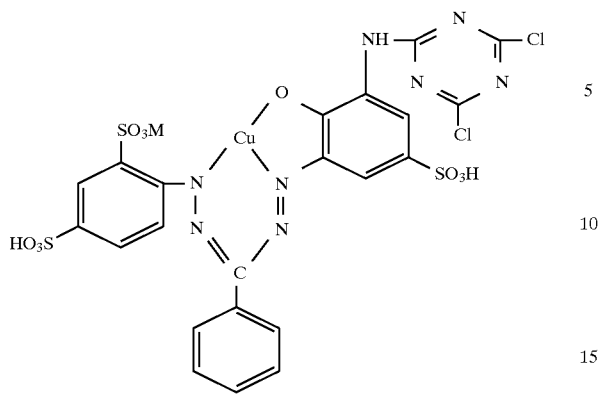

EXAMPLES 47

Formazan derivatives produced in Example 46 is reacted with the same compounds and process as those of Example 3 to give a blue (606 nm) formazan derivatives:

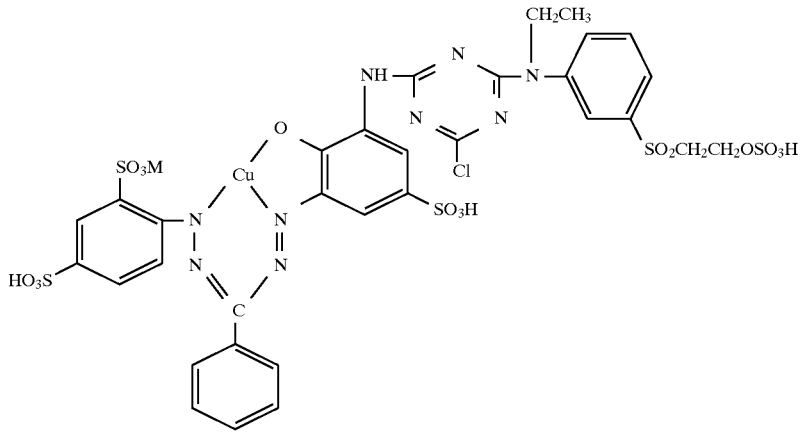

EXAMPLES 48 to 88

Formazan derivatives produced in Example 46 is reacted with the same compounds and process as those of Example 3, except that the following compounds are used instead of 1-N-ethylaminobenzene-3-β-sulfatoethylsulfone. As a result, blue(606±2 nm) formazan derivatives are obtained.

| Example No. | Used compounds |
|---|---|
| 48 | 1-N-ethylaminobenzene-4-β-sulfatoethylsulfone |
| 49 | 1-N-ethylaminobenzene-2-β-sulfatoethylsulfone |
| 50 | 1-N-ethylamino-4-methoxybenzene-3-β-sulfatoethylsulfone |
| 51 | 1-N-methylaminobenzene-3-β-sulfatoethylsulfone |
| 52 | 1-N-methylaminobenzene-4-β-sulfatoethylsulfone |
| 53 | 1-N-methylaminobenzene-2-β-sulfatoethylsulfone |
| 54 | 1-N-methylamino-4-methoxybenzene-3-β-sulfatoethylsulfone |
| 55 | 1-N-β-carbamoylethylaminobenzene-3-β-sulfatoethylsulfone |
| 56 | 1-N-β-carbamoylethylaminobenzene-4-β-sulfatoethylsulfone |
| 57 | 1-N-β-carbamoylethylaminobenzene-2-β-sulfatoethylsulfone |
| 58 | 1-N-β-carbamoylmethylamino-4-methoxybenzene-3-β-sulfatoethylsulfone |
| 59 | 1-N-n-propylaminobenzene-3-β-sulfatoethylsulfone |
| 60 | 1-N-n-propylaminobenzene-4-β-sulfatoethylsulfone |
| 61 | 1-N-n-propylaminobenzene-2-β-sulfatoethylsulfone |
| 62 | 1-N-n-propylamino-4-methoxybenzene-3-β-sulfatoethylsulfone |
| 63 | 1-N-β-cyanoethylaminobenzene-3-β-sulfatoethylsulfone |
| 64 | 1-N-β-cyanoethylaminobenzene-4-β-sulfatoethylsulfone |
| 65 | 1-N-β-cyanoethylaminobenzene-2-β-sulfatoethylsulfone |
| 66 | 1-N-β-cyanomethylamino-4-methoxybenzene-3-β-sulfatoethylsulfone |
| 67 | 1-N-β-hydroxyethylaminobenzene-3-β-sulfatoethylsulfone |
| 68 | 1-N-β-hydroxyethylaminobenzene-4-β-sulfatoethylsulfone |
| 69 | 1-N-β-hydroxyethylaminobenzene-2-β-sulfatoethylsulfone |
| 70 | 1-N-β-hydroxyethylaminobenzene-4-methoxybenzene-3-β-sulfatoethylsulfone |
| 71 | 1-N-β-sulfatoethylaminobenzene-3-β-sulfatoethylsulfone |
| 72 | 1-N-β-methoxycarbonylethylaminobenzene-3-β-sulfatoethylsulfone |
| 73 | 1-N-methylamino-2-methoxybenzene-5-β-sulfatoethylsulfone |
| 74 | 1-N-ethylamino-2,4-dimethylbenzene-5-β-sulfatoethylsulfone |
| 75 | 1-N-ethylamino-2-methoxy-5-methylbenzene-3-β-sulfatoethylsulfone |
| 76 | 1-N-ethylaminonaphthalene-6-β-sulfatoethylsulfone |
| 77 | 1-N-ethylamino-8-sulfonaphthalene-6-β-sulfatoethylsulfone |
| 78 | 1-N-methylaminonaphthalene-8-β-sulfatoethylsulfone |
| 79 | 1-aminobenzene-4-β-sulfatoethylsulfone |
| 80 | 1-aminobenzene-2-β-sulfatoethylsulfone |
| 81 | 1-aminobenzene-3-β-sulfatoethylsulfone |
| 82 | 1-amino-4-methoxybenzene-3-β-sulfatoethylsulfone |
| 83 | 1-amino-2-methoxybenzene-5-β-sulfatoethylsulfone |
| 84 | 1-amino-2-methoxy-5-methylbenzene-5-β-sulfatoethylsulfone |
| 85 | 1-amino-2,4-dimethylbenzene-5-β-sulfatoethylsulfone |
| 86 | 1-aminonaphthalene-6-β-sulfatoethylsulfone |

| Example No. | Used compounds | |
|---|---|---|
| 87 | 1-amino-8-sulfonaphthalene-6-β-sufatoethylsulfone | |
| 88 | 1-aminonaphthalene-8-β-sulfatoethylsulfone | |

Experiments for dyeing property for formazan derivatives of the present invention are conducted.

Experiment 1

0.1 part of metal formazan derivatives having the below formula described in EP 0,099,721 and 0.1 part of metal formazan derivatives produced in Example 3 are separately melted in 200 parts of water to give a dyeing solution.

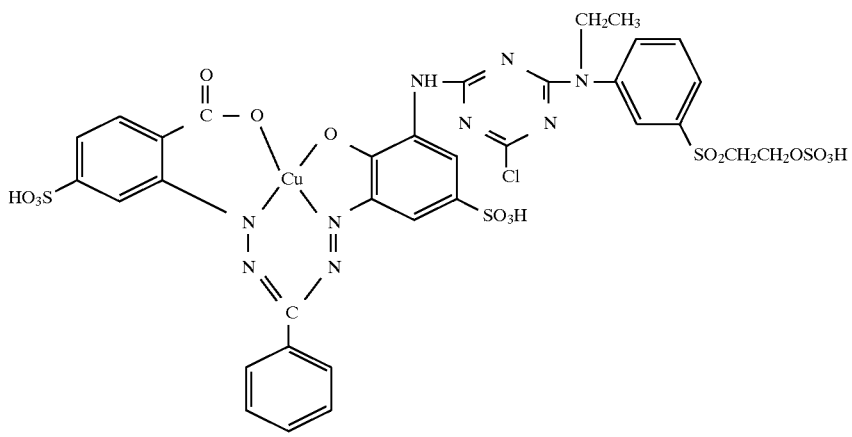

10 parts of sodium sulfate are added to the solution and then 10 parts of cotton cloth are added thereto. The solution is heated to temperature of 60° C. At this temperature, 4 parts of sodium hydrogen carbonate are added thereto and stirred for one hour.

Dyed cloth is washed by water, washed again by boiled soup water for 10 minutes, then washed by water to remove soup water, and dried. Dyeing property and remained concentration after washing soup water are compared and the results are shown in the below table.

Experiment 2

The procedure described in Experiment 1 is repeated, except that metal formazan compound of EP 0,099,721 and 0.2 part of metal formazan compound produced in Example 3 are solubilized in 200 parts of water to form a dyeing solution. Dyeing property and remained concentration after washing soup water are compared and the results are shown in the below table.

Experiment 3

The procedure described in Experiment 1 is repeated, except that metal formazan compound of EP 0,099,721 and 0.4 part of metal formazan compound produced in Example 3 are solubilized in 200 parts of water to form a dyeing solution. Dyeing property and remained concentration after washing soup water are compared and the results are shown in the below table.

Sunlight fastness and washing fastness for the dried cloth used in the experiments of the dyeing property are determined according to JIS L 0841 and JIS L 0844, and chlorine fastness in 20 ppm solution of sodium hypochloride is determined. The results are shown in Table.

TABLE

| | | EP 0,099,721 | The Present Invention |
|---|---|---|---|
| Experiment 1 | Dyeing Property | 100 | 104.41 |
| | Remained Concentration After Washing of Soup Water | 100 | 76.64 |
| Experiment 2 | Dyeing Property | 100 | 105.63 |
| | Remained Concentration After Washing of Soup Water | 100 | 71.38 |
| Experiment 3 | Dyeing Property | 100 | 105.59 |
| | Remained Concentration After Washing of Soup Water | 100 | 73.35 |
| | Sunlight Fastness | 5< | 5–6 |
| | Washing Fastness | 4 | 5 |
| | Chlorine Fastness | 4 | 4 |

As seen from the above table, dicyclic metal formazan compound has excellent dyeing property as compared with the conventional tricyclic metal formazan compound. Further, the dye stuff withstand removing from fiber after washing the dyed cloth with soup water as well as has excellent post-dyeing sunlight and washing fastness.

Dicyclic metal formazan compound of the formula (1) can be also used as reactive dye in fiber having dydroxy group or amido group.

We claim:

1. Dicyclic metal formazan derivatives represented by the below formula (1):

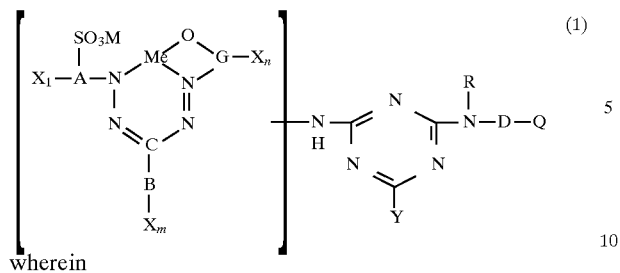

wherein

A is benzene or naphthalene having 1–3 substituent groups and sulfo group (—$SO_3M$) in ortho-position for N-atom of hydrazone compound;

B is straight-or branched-chained alkyl group, phenyl group or naphthyl group having 0–5 substituent groups, or heterocyclic group;

G is benzene or naphalene having from 1 to 3 substituent groups;

D is benzene or naphthalene;

M is hydrogen atom, alkali metal or alkali earth metal;

Me is metal ion of atomic number 27–29;

Y is halogen;

X is hydrogen atom or sulfo group (—$SO_3M$), carboxyl group, phosphonic group providing solubility for water;

R is straight- or branched-chain alkyl group;

Q is —$SO_2CH=CH_2$, or —$SO_2CH_2CH_2L$ (L is —$OPO_3H_2$, —$SSO_3H_2$ or —$OSO_3H$ ); and l,m,n are independently an integer from 0–3.

2. Dicyclic metal formazan derivatives according to claim 1 represented by the below formula (6):

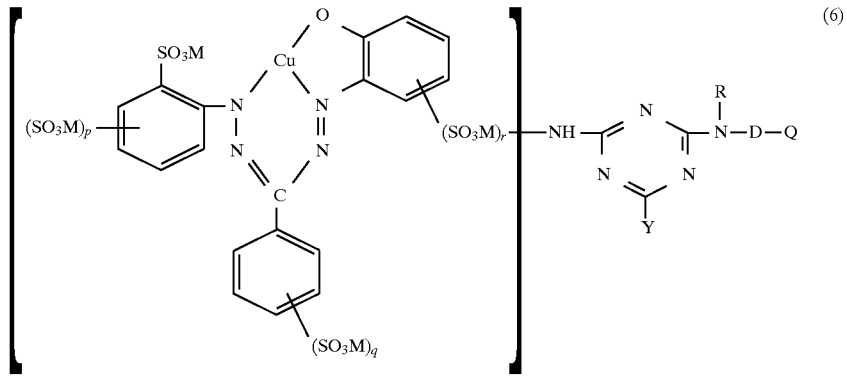

wherein p, q and r are independently 0 or 1, provided that the total number of them is an integer of 3 or less.

3. Dicyclic metal formazan derivatives according to claim 1 represented by the below formula (6'):

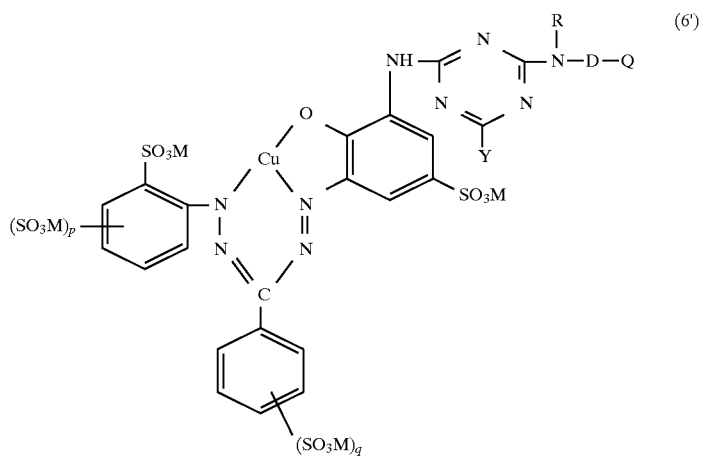

wherein p, q and r are independently 0 or 1, provided that the total number of them is an integer of 3 or less.

4. Dicyclic metal formazan derivatives according to claim 3 represented by the below formula (6"):

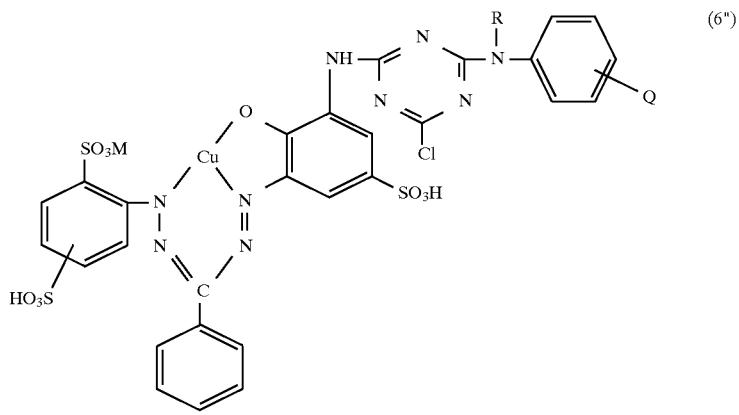

5. Dicyclic metal formazan derivatives according to claim 1 represented by the below formula:

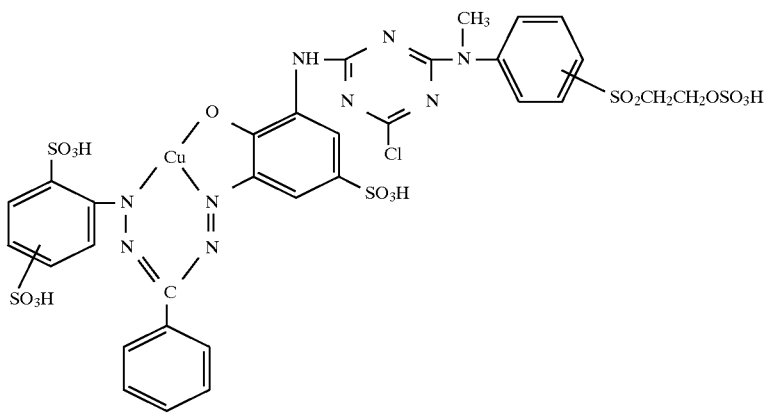
6. Dicyclic metal formazan derivatives according to claim 4 represented by the below formula:
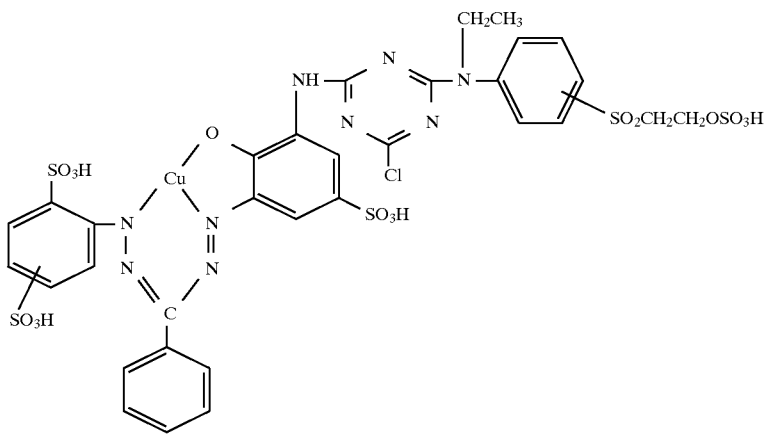
7. Dicyclic metal formazan derivatives according to claim 4 represented by the below formula:
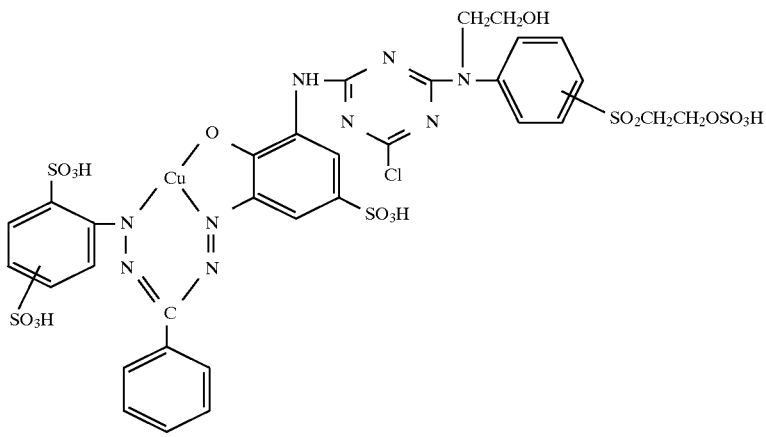
8. Dicyclic metal formazan derivatives according to claim 4 represented by the below formula:

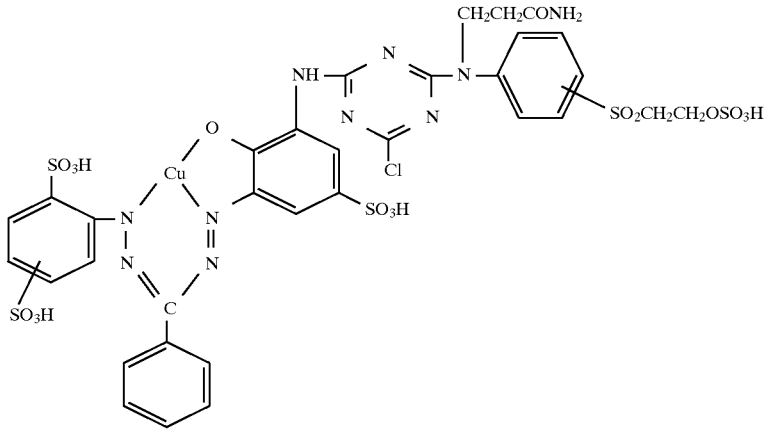

9. A process for producing dicyclic formazan derivatives of the formula (1) by firstly condensing formazan compound of the below formula (2) with 1,3,5-trihalogeno-s-triazine to give formazan compound of the below formula (3), and secondly condensing the obtained formazan compound of the formula (3) with amine compound of the below formula (4):

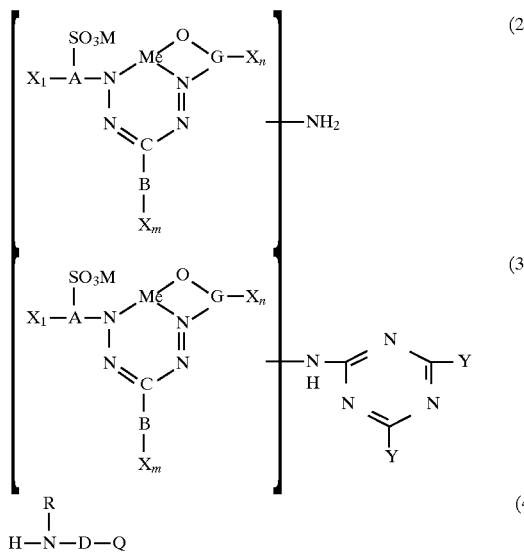

wherein
A is benzene or naphthalene having 1 to 3 substituent groups and sulfo group (—$SO_3M$) in ortho position for N-atom of hydrazone compound;
B is straight-or branched-chained alkyl group, phenyl group or naphthyl group having 0–5 substituent groups, or heterocyclic group;
G is benzene or naphalene having from 1 to 3 substituent groups;
D is benzene or naphthalene;
M is hydrogen atom, alkali metal or alkali earth metal;
Me is metal ion of atomic number 27–29;
Y is halogen;
X is hydrogen atom or sulfo group (—$SO_3M$), carboxyl group, phosphonic group providing solubility for water;
R is straight-or branched-chain alkyl group;
Q is —$SO_2CH=CH_2$, or —$SO_2CH_2CH_2L$ (L is —$OPO_3H_2$, —$SSO_3H_2$ or —$OSO_3H$); and
l,m,n are independently an integer from 0–3.

10. A process for producing dicyclic formazan derivatives according to claim 9, wherein the first condensation is conducted at pH 2 to 4 and temperature of −5° to 20° C., and the second condensation is conducted at pH 4 to 8 and temperature of 20° to 70° C.

11. A process for producing dicyclic formazan derivatives according to claim 10, wherein the first condensation is conducted at pH 3 to 4 and temperature of 0° to 10° C., and the second condensation is conducted at pH 4 to 6 and temperature of 30° to 60° C.

12. Dye composition comprising the below formula (1):

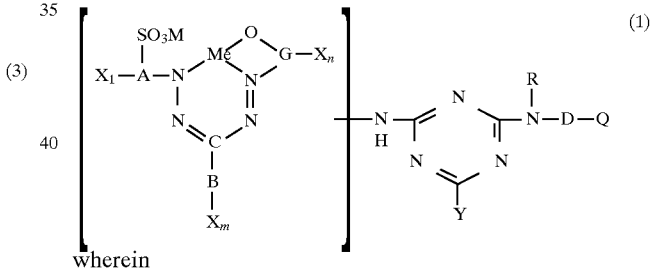

wherein
A is benzene or naphthalene having 1–3 substituent groups and sulfo group (—$SO_3M$) in ortho-position for N-atom of hydrazone compound;
B is straight-or branched-chained alkyl group, phenyl group or naphthyl group having 0–5 substituent groups, or heterocyclic group;
G is benzene or naphalene having from 1 to 3 substituent groups;
D is benzene or naphthalene;
M is hydrogen atom, alkali metal or alkali earth metal;
Me is metal ion of atomic number 27–29;
Y is halogen;
X is hydrogen atom or sulfo group (—$SO_3M$), carboxyl group, phosphonic group providing solubility for water;
R is straight-or branched-chain alkyl group;
Q is —$SO_2CH=CH_2$, or —$SO_2CH_2CH_2L$ (L is —$OPO_3H_2$, —$SSO_3H_2$ or —$OSO_3H$); and
l,m,n are independently an integer from 0–3.

13. Process for dyeing fabrics by using dicyclic formazan derivatives represented by the formula (1):

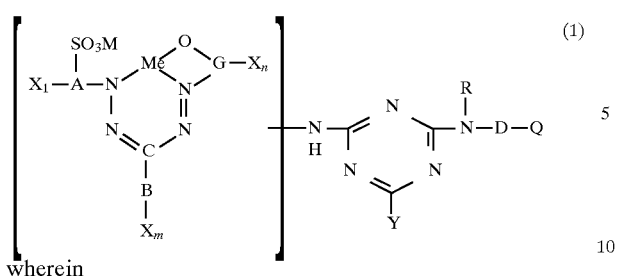

wherein

A is benzene or naphthalene having 1–3 substituent groups and sulfo group (—SO$_3$M) in ortho-position for N-atom of hydrazone compound;

B is straight-or branched-chained alkyl group, phenyl group or naphthyl group having 0–5 substituent groups, or heterocyclic group;

G is benzene or naphalene having from 1 to 3 substituent groups;

D is benzene or naphthalene;

M is hydrogen atom, alkali metal or alkali earth metal;

Me is metal ion of atomic number 27–29;

Y is halogen;

X is hydrogen atom or sulfo group (—SO$_3$M), carboxyl group, phosphonic group providing solubility for water;

R is straight- or branched-chain alkyl group;

Q is —SO$_2$CH=CH$_2$, or —SO$_2$CH$_2$CH$_2$L (L is —OPO$_3$H$_2$, —SSO$_3$H$_2$ or —OSO$_3$H ); and l,m,n are independently an integer from 0–3.

* * * * *